Feb. 3, 1953 R. H. LESHER 2,627,253
ROTARY GAS ENGINE
Filed Sept. 16, 1949 8 Sheets-Sheet 1

INVENTOR.
RALPH H. LESHER
BY Whiteley and Caine
ATTORNEYS

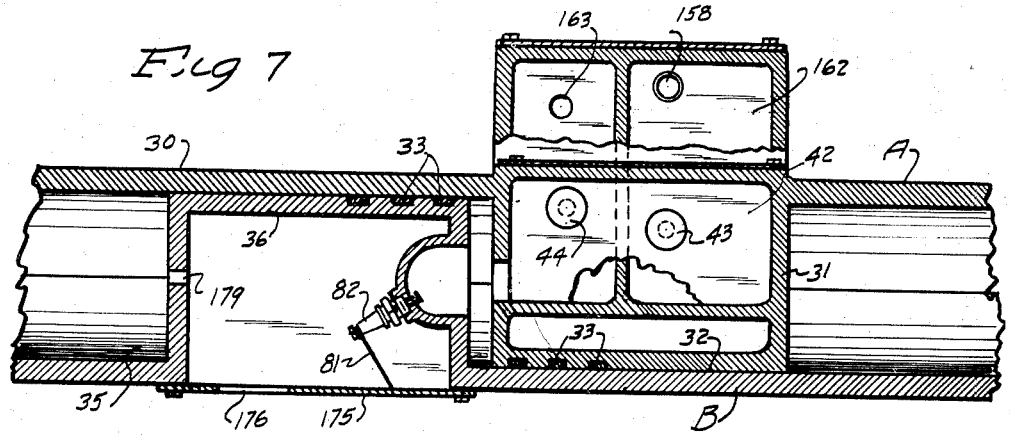
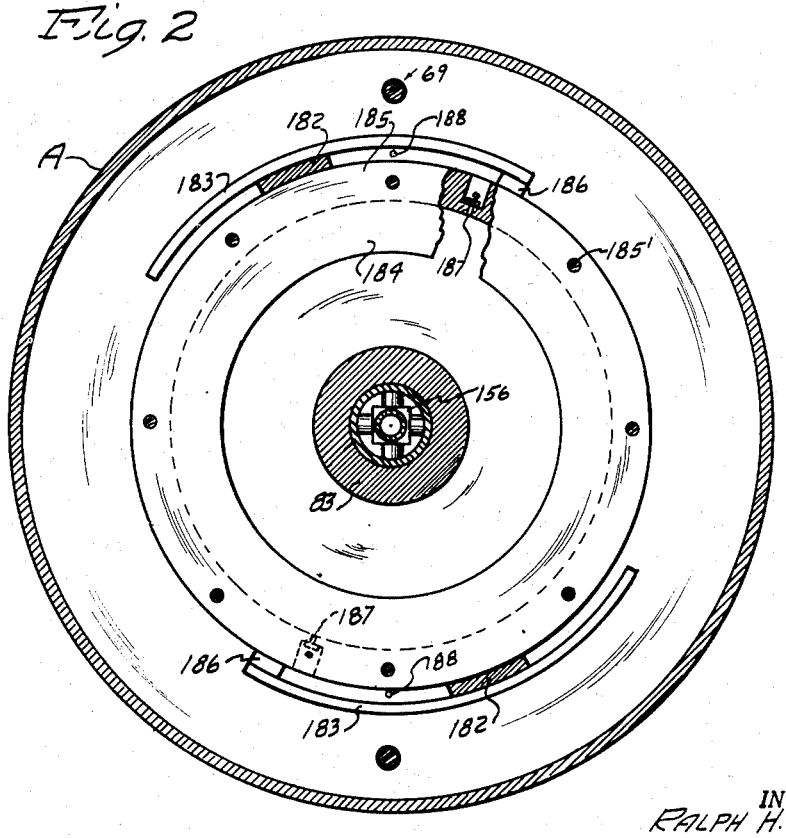

Feb. 3, 1953 R. H. LESHER 2,627,253
ROTARY GAS ENGINE
Filed Sept. 16, 1949 8 Sheets-Sheet 3

INVENTOR.
RALPH H. LESHER
BY Whiteley and Caine
ATTORNEYS

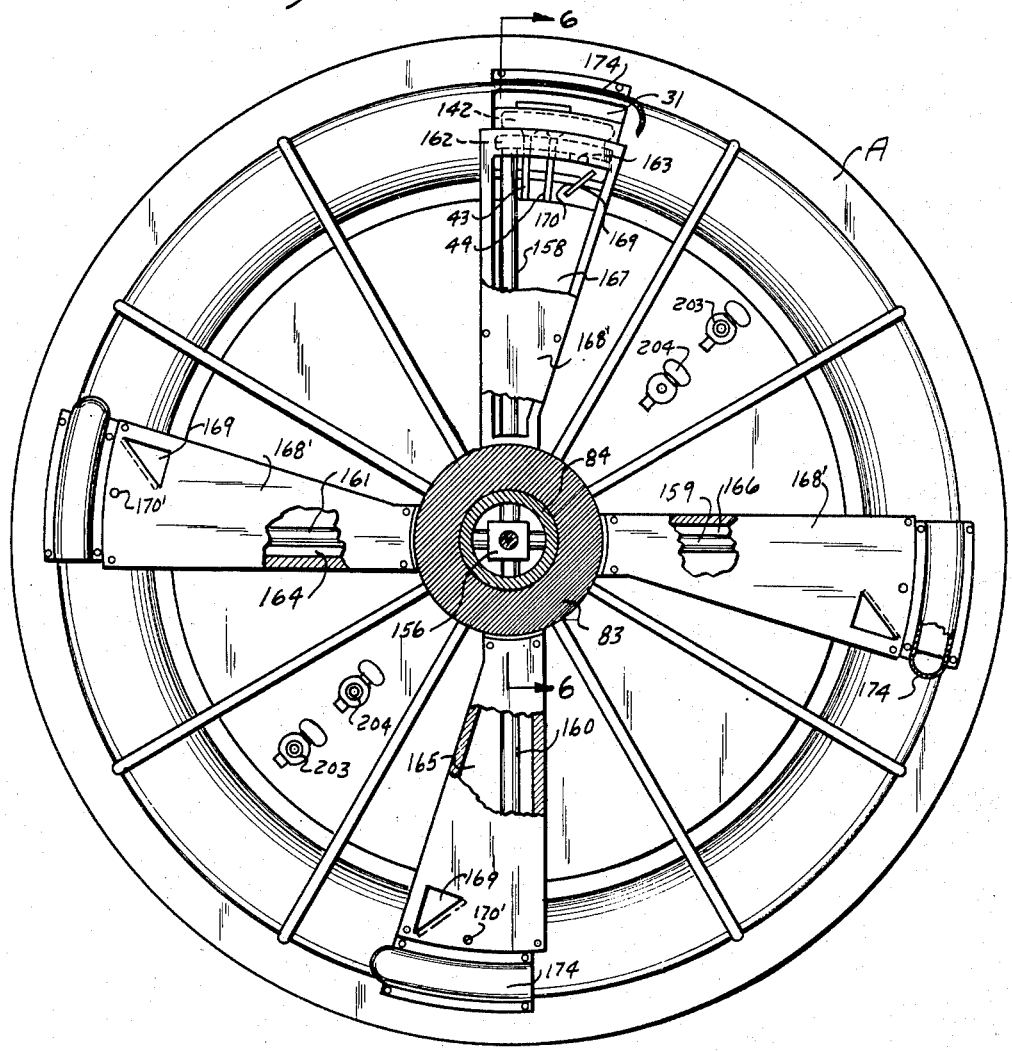

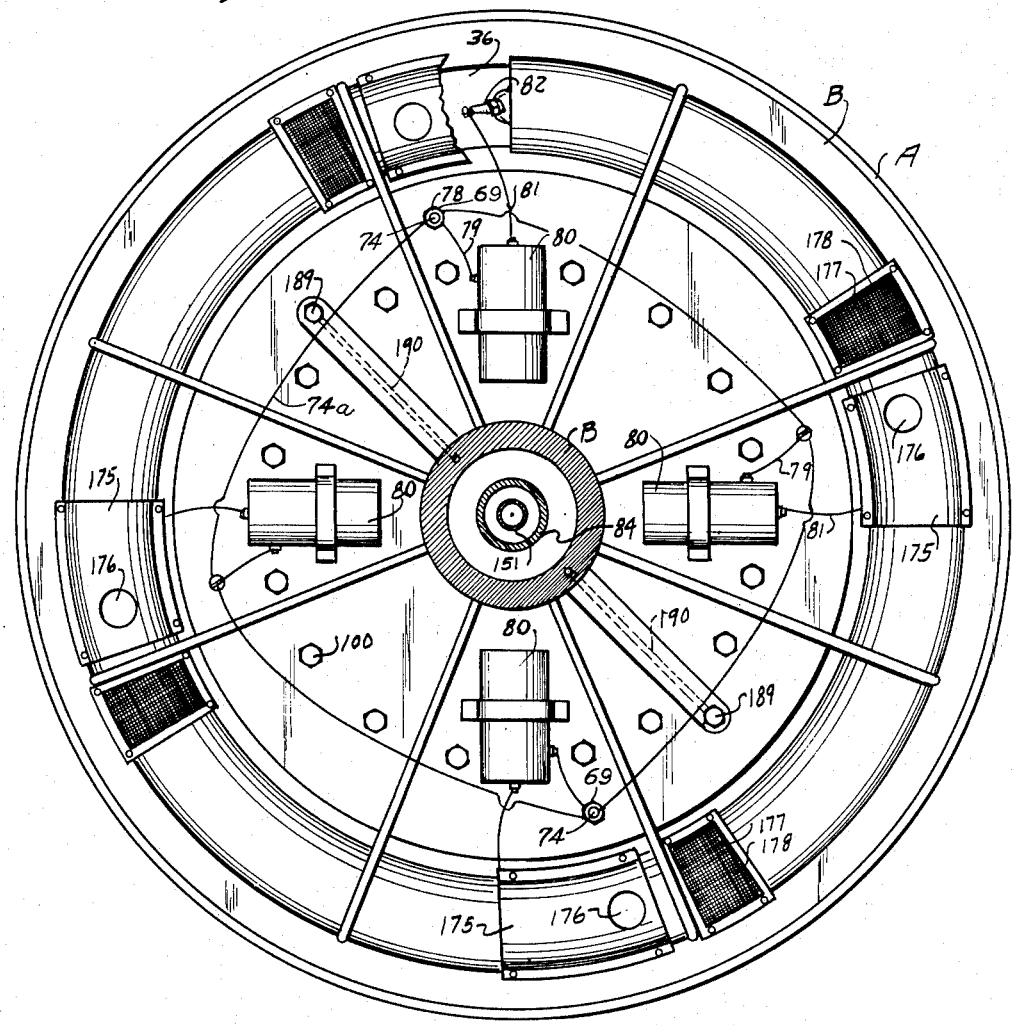

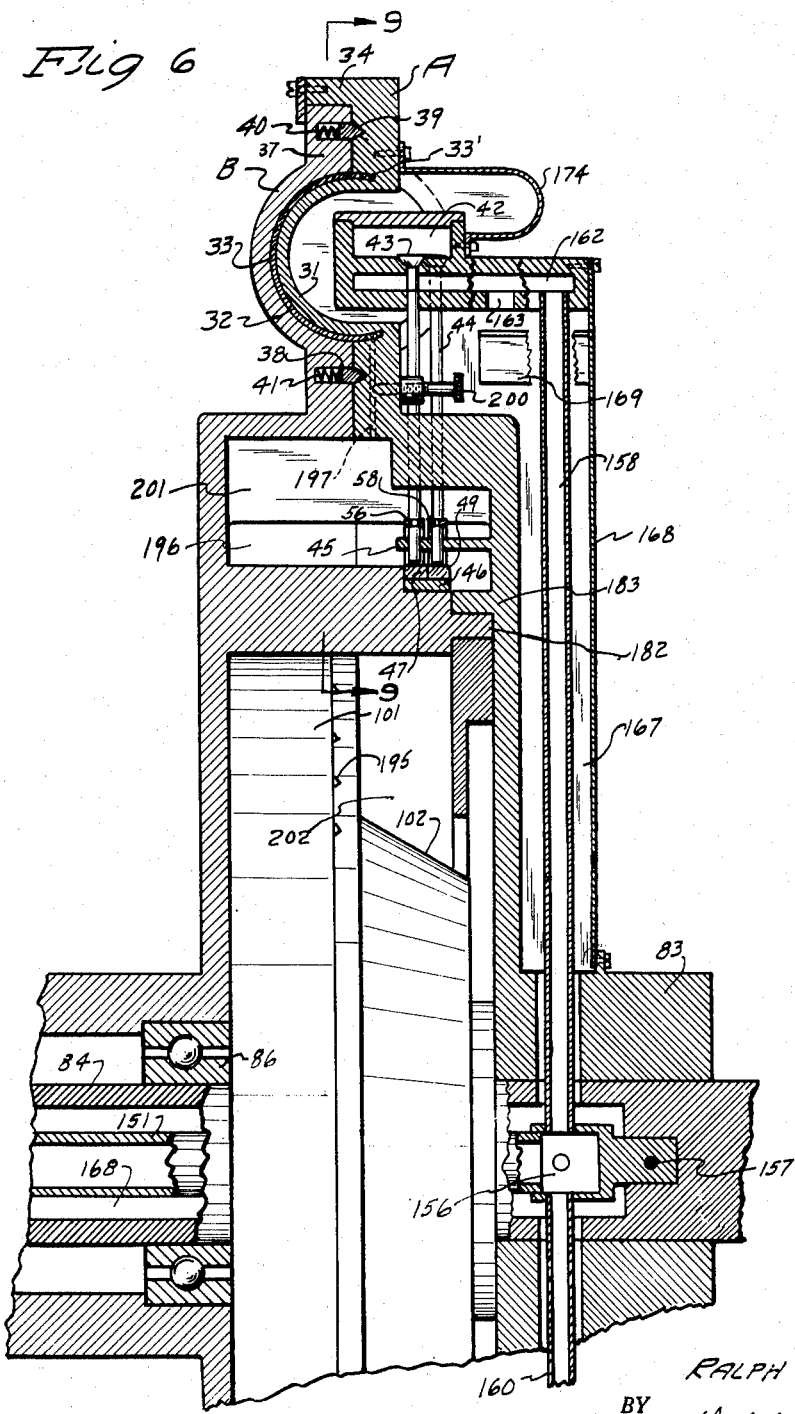

Feb. 3, 1953 R. H. LESHER 2,627,253
ROTARY GAS ENGINE
Filed Sept. 16, 1949 8 Sheets-Sheet 7
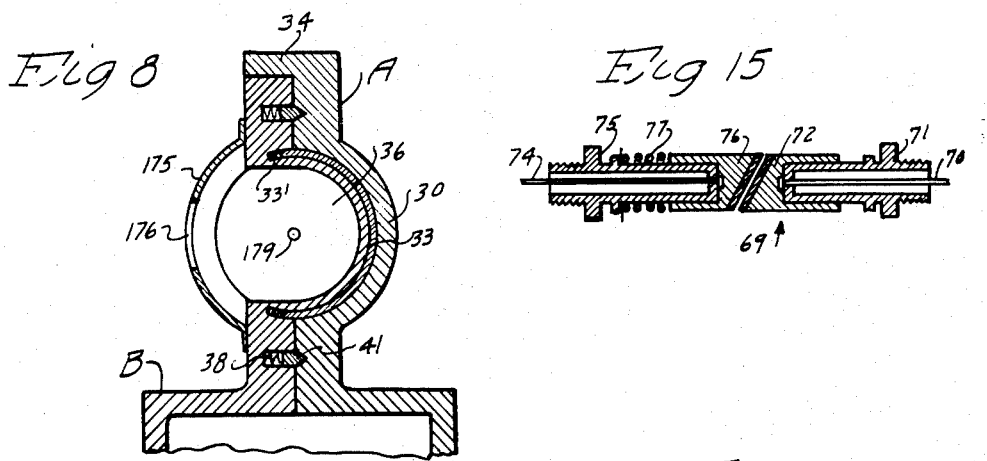
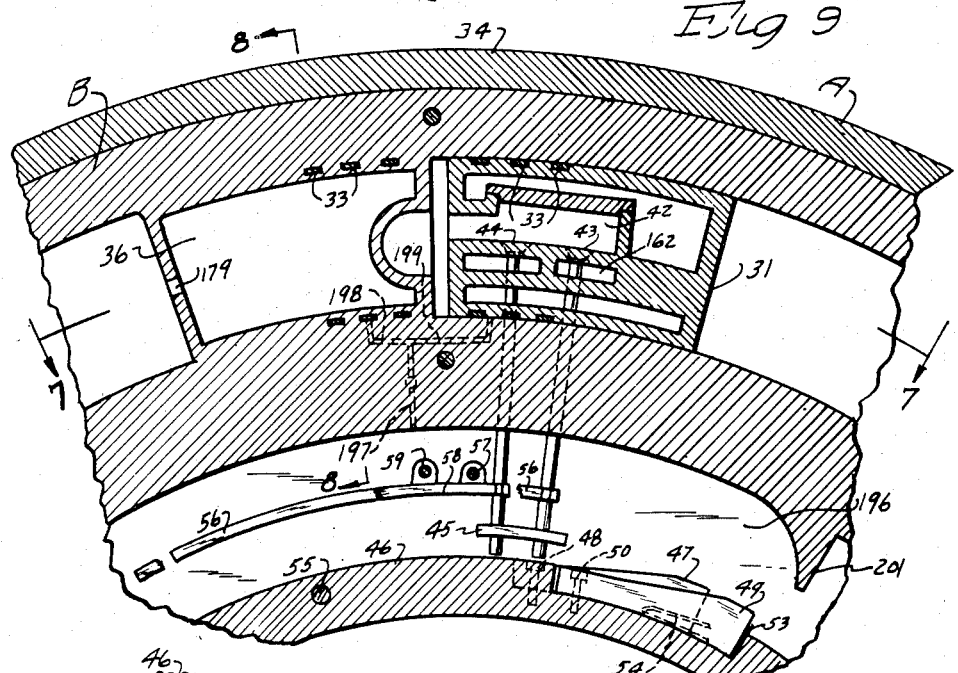
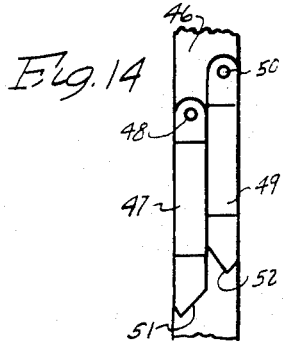
INVENTOR.
RALPH H LESHER
BY Whiteby and Caine
ATTORNEYS

UNITED STATES PATENT OFFICE 2,627,253

ROTARY GAS ENGINE

Ralph H. Lesher, Minneapolis, Minn.

Application September 16, 1949, Serial No. 116,005

10 Claims. (Cl. 123—11)

My invention relates to a rotary type internal combustion engine, and the present application is a continuation in part of my previous application Ser. No. 660,657, filed April 9, 1946, now abandoned.

In general, the invention relates to a rotary type engine composed of two relatively movable major portions which form between them the means of operating the engine and which are interconnected so that useful work can be performed.

More particularly, the invention contemplates two major portions of a generally circular outline which are sealed at their peripheries but are, nonetheless, relatively movable. Between the peripheries of the two major portions an annular chamber is formed and within this chamber and secured to one of the members are a plurality of pistons which cooperate with a plurality of abutments that are secured to the other member. Between the abutments and pistons are a plurality of combustion chambers within which the explosion of fuel occurs. Suitable means are provided for introducing fuel, exploding the same and exhausting spent products of combustion. Since the parts are relatively movable, an interconnected means is provided so that the force of the explosions will be transmitted to a driven shaft to cause said shaft to move in only one direction. An oiling system is made up of parts carried between two major portions and provides means for positively and adequately oiling all of the moving parts.

Unlike conventional internal combustion engines where a series of pistons are connected to a crankshaft and move relatively with respect to each other so as to produce a series of continuing explosions in regularly timed sequence, this engine is made up of a number of pistons which are rigidly connected to one major portion of the device and they all move simultaneously in a single power stroke with respect to their cooperating abutments. When this occurs, the several pistons advance in the direction of the rear of the succeeding abutments. Their movement is utilized to provide for the exhausting of the spent products of combustion and the introduction of fresh fuel charges. Provided the load is not excessive, the pistons will remain in their advanced position until the inertia of the load causes that portion of the engine to which they are connected to gradually slow down. The portion of the engine which carries the abutments is interconnected with the piston-carrying portion and the driven shaft so that when the explosions occur the force which is directed against the abutments will tend to aid in advancing the piston-carrying portion. The abutment-carrying portion will, therefore, continue to rotate in the same direction as the piston-carrying portion, but at a somewhat slower rate immediately after the explosions occur. As long as the load is not excessive, when the pistons move in advance of the abutments, they will be locked in their advance position until the load begins to retard their rate of rotation. By this arrangement the rapidity of explosions will depend entirely upon the load and with a relatively light load it is conceivable that the engine would be able to rotate several times without further impetus, whereas under a heavy load several explosions could occur within the space of a single rotation of the engine.

The engine is started by an electric motor which is operated continuously. A transmission is provided between the motor and the abutment-carrying portion of the engine and is capable of rotating the two parts until an explosion occurs. Thereafter the motor aids in maintaining the abutment-carrying portion at a substantially constant speed to aid in the compression operation; however, the motor is not intended in any respect to drive the main load.

The engine is of an air-cooled type and in addition to providing exterior cooling, a series of air rams are associated with each of the pistons to draw air into the combustion chamber after the explosion to aid in scavenging the spent products of combustion as well as internally cooling the engine.

The fresh fuel is thoroughly mixed on its way to the combustion chambers and travels in a counter-current direction with respect to the hot spent gases so as to be heated thereby. Valves are provided for the control of the introduction of fuel and the discharge of spent gases, and are located inside of the engine and are operated by cam arrangements to exhaust and introduce new fuel after combustion has occurred. Ignition is arranged to occur in each of the combustion chambers when the several pistons and their cooperating abutments are in a prearranged position with respect to each other.

An object of the invention is to provide a rotary type internal combustion engine made up of two major portions which are generally circular in outline and constructed to form a peripheral annular chamber within which a series of cooperating pistons and abutments are positioned, each of which series are secured to one of the major portions so that they are relatively movable.

Another object is to provide a rotary type internal combustion engine composed of two relatively movable major portions which are interconnected at their peripheries to form sealed combustion chambers, and which are internally interconnected so that the force of the explosions is directed in only one direction.

Another object is to provide in an engine of the class described, a lubricating system which is operative to properly oil the several moving parts.

Another object is to provide in an engine of the class described, means for starting the engine in the form of a continuously operating electric motor and transmission means, which when the engine is self-operating, serves to maintain one portion thereof at a substantially constant speed to aid in the compression of fuel charges.

Another object is to provide a means of controlling the speed of the engine when the same is not operating under full load and is thus effective to prevent the engine from burning up because of excessive speed.

A further object is to provide means for controlling the flow of fuel and spent products of combustion and to properly time the electrical means used to ignite the fuel.

Other and further objects will become apparent from the following description and claims, and in the appended drawings in which:

Fig. 2 is a vertical transverse section of the engine taken on line 2—2 of Fig. 1, showing parts which are in the interior of the engine and carried by the major portion "A";

Fig. 4 is a view in side elevation with parts in cross section and generally resembles the device as seen on line 4—4 of Fig. 1, looking in the direction of the arrows;

Fig. 5 is an exterior view of the invention taken along line 5—5 of Fig. 1, looking in the direction of the arrows to show portion "B";

Fig. 6 is an enlarged section taken on line 6—6 of Fig. 4;

Fig. 7 is an enlarged top section taken on line 7—7 of Fig. 9 with portions broken away to show interior structure;

Fig. 8 is a cross section taken on line 8—8 of Fig. 9;

Fig. 9 is a section taken on line 9—9 of Fig 6;

Fig. 14 is a top plan view of the cams shown in Fig. 9; and,

Fig. 15 is a cross section of an electrical conducting device which extends between the two portions of the engine.

Figure 1:
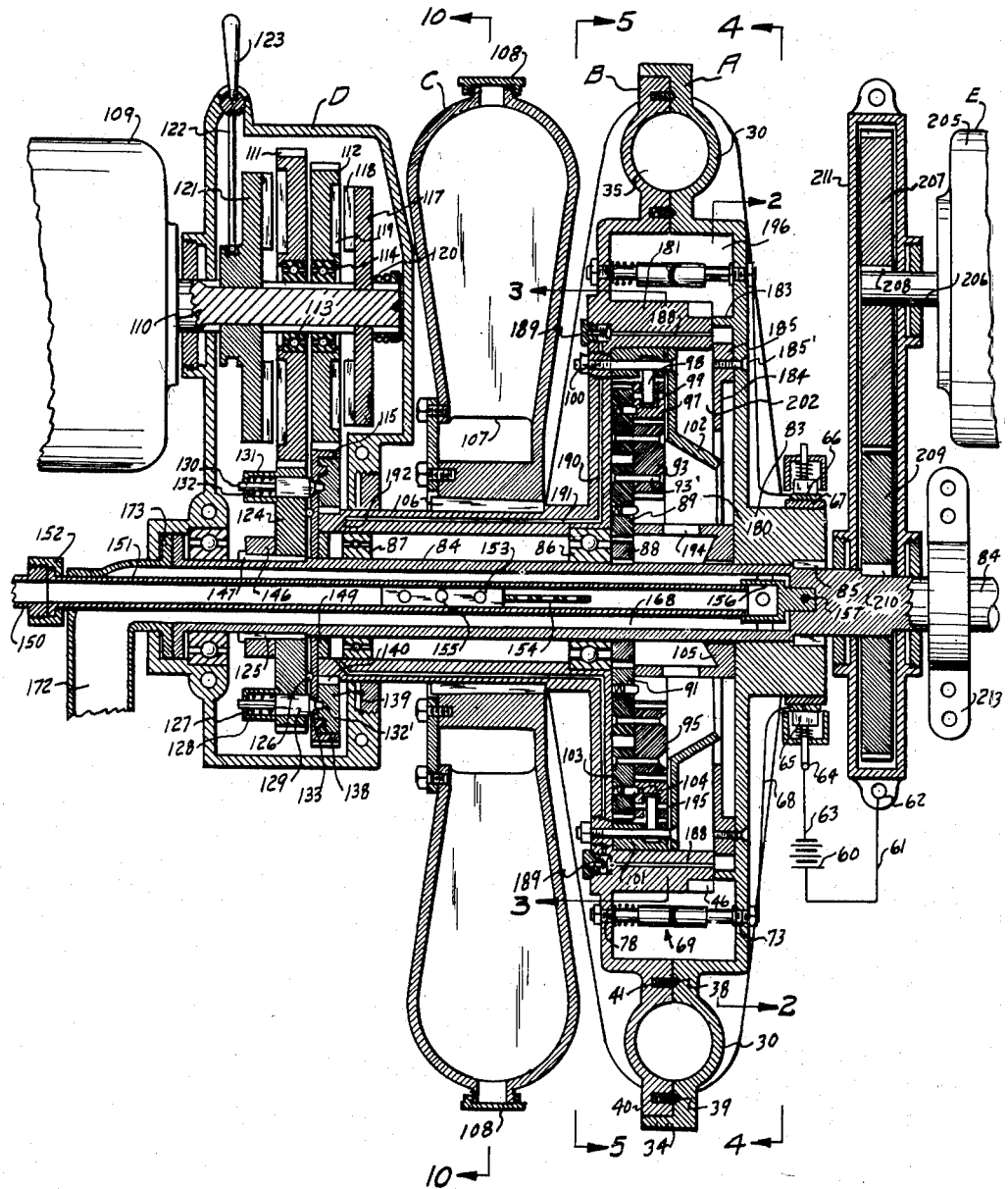
Fig. 1 is a sectional plan view taken through the center of the engine forming the present invention.

Referring now to the several views of the drawing, the invention will be described in detail. Referring first to Fig. 1, the device is made up of several major parts. The engine proper is made up of two castings which are circular in outline, as shown in Figs. 4 and 5, and are designated by the reference characters A and B. An inertia stabilizer is designated by the reference C, and a starting motor with its cooperating parts is designated by the character D. An electric generator is designated by the character E.

Starting with the engine proper, the casting A, as seen in Fig. 1, constitutes a concave disk which at its periphery is semicircular, as indicated at 30. Within the contour 30 and spaced at 90° angles with respect to each other, as seen in Figs. 4, 6, 7 and 9, are four pistons indicated at 31. The several pistons 31 are formed integral with casting A and have an outer cylindrical surface designated at 32 in Figs. 6 and 7. Secured to the outer surface of the several pistons and shown in enlargement is Figs. 6 and 7 are a plurality of seals 33 which in their full extent are slightly more than semi-annular. These seals 33 serve the same purpose as piston rings in a conventional engine. The seals 33 are each held in place by a small flat spring 33' at each end of the seal. At the extreme periphery of casting A the same is formed into a sealing flange 34.

As shown in Figs. 1 and 7, the casting B is also cylindrical in outline and is formed adjacent its periphery with an annular channel 35. Within this channel 35 and clearly shown in Figs. 7, 8 and 9 are a plurality of abutments 36. The abutments 36, as shown in the lower portion of Fig. 8, are partially cylindrical and fit in the channels 30, 35 in cooperating relationship with the pistons 31. The abutments 36 carry a plurality of seals 33 which are identical with the seals used on the pistons 31, as seen in Fig. 8. The seals 33 carried by the abutments engage the inner surface of channel 30 while the seals 33, carried by the pistons, engage the inner surface of channel 35. At its extreme periphery, Fig. 6, casting B is provided with a flange 37 which engages flange 34 of casting A. The castings A and B, as seen in Figs. 1 and 6, are relatively movable and are sealed with respect to each other by a first V-shaped ring 38 adjacent the outer periphery of the channel portions and a second V-shaped ring 39 at the inner edge of the channel portions. The sealing rings 38, 39 are held in place by springs 40, 41, which are themselves enclosed within recesses in the B casting. A plurality of these springs are used to provide the sealing of the rings and they may be disposed at 90° angles with respect to each other.

Referring now to the right hand side of Figs. 6 and 9, piston 31 has an interior chamber 42 which is in communication with the port of an inlet valve 43 and an exhaust valve 44 for introducing and exhausting gases with respect to the annular chamber between adjacent pairs of pistons and abutments. The valves 43 and 44, which are conventional poppet valves, are supported on a member 45 for independent movement with respect to each other.

Referring now to Figs. 1 and 9, there is disclosed a cam ring 46. Cam ring 46 carries on its periphery a plurality of dwells 47 which are pivotally supported on ring 46 at 48 for pivotal movement. Also mounted on ring 46 are a plurality of dwells 49 which are pivotally supported at 50. As indicated in Fig. 14, each of the dwells 47, 49 has an angular surface shown respectively at 51, 52. As shown in Fig. 9, where only one dwell is designated, the cam ring 46 is provided with a recess 53 and a leaf spring 54 is shown engaging the inner side surface of the dwell 49. The cam ring 46 is secured on the inner surface of the B casting by a plurality of fastening devices 55, as clearly shown in Fig. 9.

Referring now to Fig. 9, the intake valve 43 is slidably mounted on a curved bar 56 which is pivotally supported on the A casting by a bolt 57. The exhaust valve 44 is slidably mounted on a curved rod 58 which is pivotally supported on the interior of casting A by a bolt 59. The function of the rods 56, 58 is to maintain their cooperating valves in a normally closed position under the impetus of centrifugal force when the casting is rotating at high speed.

The ignition system will now be described in conjunction with Figs. 1, 5 and 15. Referring first to Fig. 1, a battery 60 is connected by a conductor 61 to a ground connection on the frame of the engine designated at 62. From the positive side of the battery a cable 63 is joined through a connection 64 to a brush 65. The brush 65 engages a conducting ring 66 which is insulated from the A casting by a fiber ring 67. A conductor 68 extends from the ring 66 to a device indicated generally at 69, which is shown in detail in Fig. 15.

Referring now to Fig. 15, the device 69 consists of a cable 70 which extends through an insulated member 71 to a conductor 72 which has an angular outer surface. The portion 71 extends through an aperture 73, seen in Fig. 1. Continuing again with Fig. 15, a second cable 74 extends through an insulated member 75 to a conductor 76. A coil spring 77 is provided in conjunction with the insulating member 75 to permit a certain amount of resilient movement between the conductors 76 and 72. A portion 74 extends through an aperture 78 in the B casting, as shown in Fig. 5. The cable 74, as seen in Fig. 5, is joined by a connection 79 with a spark coil 80. A conductor 74a joins the cables 74 of oppositely disposed devices 69. From the coil 80 a conductor 81 extends to a spark plug 82 which is secured in one of the abutments 36, as is clearly shown in Fig. 7. As will be explained in detail hereinafter, current is conducted from the battery to the spark plug through the several connecting members mentioned heretofore when the A and B castings are in a critical position with respect to each other so as to create a hot spark within the combustion chambers when compression is at an extent proper for the explosion to occur.

The A casting, as shown in Fig. 1, has a large hub section 83 which is secured to the main driven shaft 84 by splines 85.

The B casting is supported on the main shaft 84 by means of a plurality of bearings 86, 87.

Figure 3:
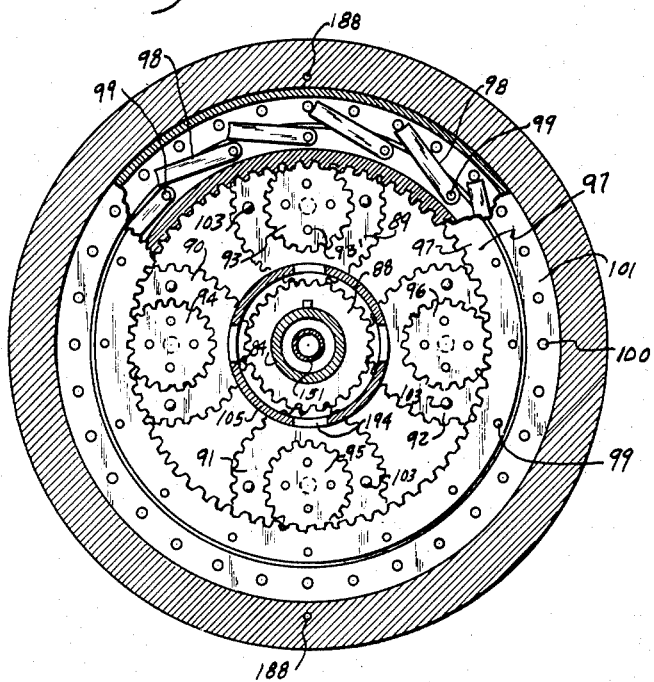
Fig. 3 is a vertical transverse section taken on line 3—3 of Fig. 1, looking in the direction of the arrows, and shows parts that are connected to or carried by the major portion "B"

Referring now to Fig. 3, the main shaft 84 has keyed thereon a gear 88. Gear 88 meshes with four quadrantly disposed gears 89, 90, 91 and 92. Each of the several gears 89, 90, 91 and 92 carries smaller gears 93, 94, 95 and 96 which mesh internally in a planetary system with a ring gear 97. Ring gear 97 carries on its outer surface a multiplicity of ratchet-like abutments 98 which are supported for pivotal movement on the outer surface of the ring gear by pins 99. All of the elements heretofore mentioned, commencing with the main shaft 84, are indirectly connected through the multiplicity of gears to the A casting and rotate with the A casting.

Continuing to refer to Fig. 3, a multiplicity of hardened bolts 100, as shown in Fig. 1, are all connected to and penetrate a ring 101, and four of these bolts penetrate a second relatively flat angularly shaped ring 102. Several of the bolts 100 penetrate the B casting to hold ring 101 rigid to the B casting, Fig. 26. The remainder only penetrate ring 101.

Referring to Figs. 1 and 3, the gears 89—91 carry a plurality of spring biased detents 103 which are adapted to engage in recesses 104 of the ring gear 97. By this arrangement the planetary gear system operates in unison with the A casting when the detents are engaged. The annular plate 102 serves to hold the gear assemblies at the outer periphery in their proper place. A tubular member 105, Fig. 1, fits over the main driven shaft 84 and on one side abuts the interior surface of the A casting while on its other side it abuts the several gears 89, 90, 91 and 92 and holds the same in proper alignment with the center gear 88.

Figure 10:
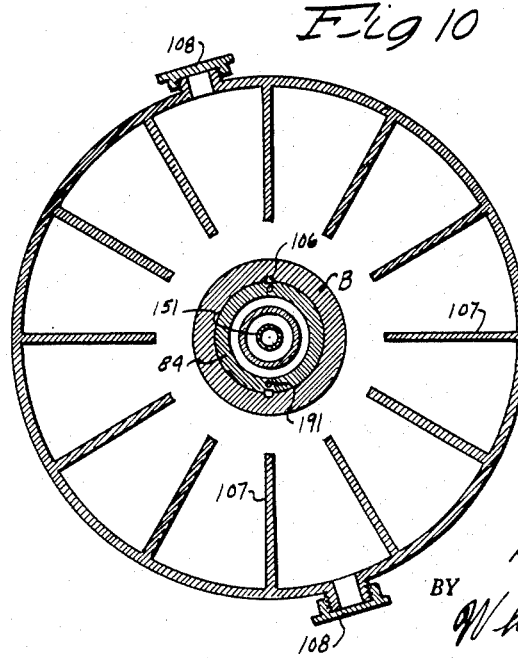
Fig. 10 is a section taken on line 10—10 of Fig. 1, looking in the direction of the arrows, and shows interior structure of the inertia stabilizer.

Referring now to Figs. 1 and 10, the inertia stabilizer indicated by reference character C is secured about a tubular projection of the B casting by means of splines 106. As shown in Fig. 10, the stabilizer contains a plurality of vanes 107 and is filled with a liquid. As shown in Fig. 1, a pair of threaded plugs 108 are secured in opposite sides of the stabilizer to provide for the introduction or removal of the fluid. While I have shown a liquid filled stabilizer, the same could be composed of solid material and its function is as an inertia device.

Referring now to Fig. 1 and at the left hand side thereof is shown an assembly, indicated at D, for starting the engine and for serving two other functions which will be set forth in detail hereinafter pertaining to maintaining the B casting at a substantially constant rate of speed during the operation of the engine, and for locking and unlocking the A and B castings with respect to each other. An electric motor 109 has a main driven shaft 110. A pair of gears 111, 112 are each independently supported on the shaft 110 by means of the bearings 113, 114. As shown in Fig. 1, gear 112 meshes with a gear 115. The cooperative effort of gears 112, 115 is utilized to start the engine and to effect this starting a clutch 117, shown in Fig. 1, has a multiplicity of angularly disposed teeth 118 which engage with similarly shaped teeth 119 on the side of the gear 112. A spring 120, Fig. 1, biases the clutch 117 against the gear 112 to normally hold these two members in engaging relationship with each other.

Figure 11:
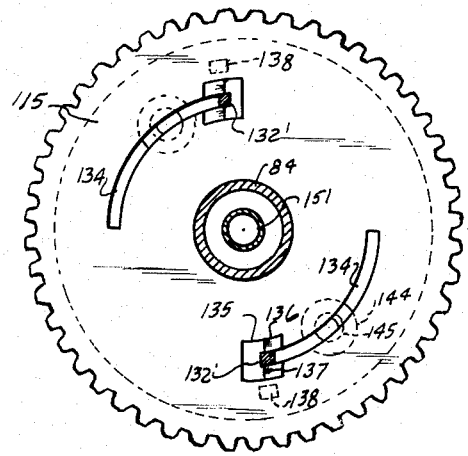
Figs. 11 and 12 are detailed views of a clutch mechanism shown in Fig. 1.

A second clutch 121 is also carried by the driven shaft 110 adjacent the gear 111. Clutch 121 is connected by a rod 122 to a manually operable member 123 which is rotatable about its central axis and provides a manual means for actuating the clutch 121. The gear 111 meshes with a gear 124, which is splined to a reduced portion of the main shaft 84 by splines 125. Gear 124 is spaced from gear 115 by a plurality of bearing members 126 to eliminate friction between the gears. The gear 124 on its left hand side has a pair of outwardly extending projections 127 having a tubular center portion 128. A pair of plugs 129 having projections 130 on the rear end thereof are positioned within the projections 127 with the portions 130 extending through apertures 131 for sliding movement. A coil spring 132 is positioned within the interior 128 of the projections 127 in surrounding relationship to portion 130. The plugs 129 are rectangular in cross-section and carry a small projection 132' on their inner ends. The plugs 129 also have a bevelled surface 133 which extends from one side to a point partially beneath the projection 132'. As shown in Fig. 11, the gear 115 has a pair of arcuate shaped slots 134 which extend to rectangular openings 135. Adjacent the openings 135 are a pair of bevelled surfaces 136, 137 on either side of the slot 134. The projections 132' of the plugs 129 are adapted to ride in the slots 134 until the plugs reach the openings 135, whence the ends of the plugs enter said openings. The bevelled surfaces 136, 137 provide for lifting the plugs 129 out of the openings 135 when gear 115 moves at a slightly faster speed than gear 124. On the side of gear 115, as shown in full line in Fig. 12 and in dotted lines in Fig. 11, are a pair of projections 138.

Figure 13:
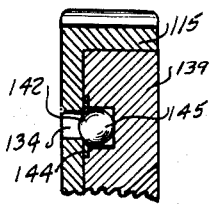
Fig. 13 is an enlarged detail section taken on line 13—13 of Fig. 12.
Figure 12:
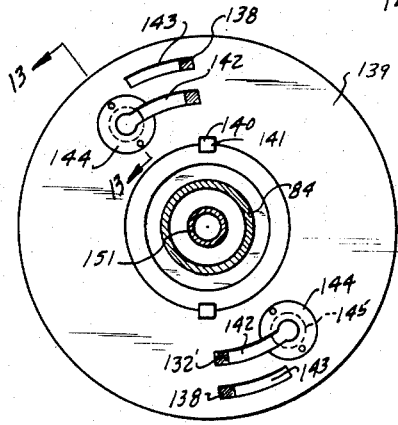

Referring now to Figs. 1, 12 and 13, there is shown a disk 139 which fits within a hollow center portion of gear 115 and disk 139 is splined to an extension of the B casting by means of splines 116 which extend into openings 141. Adjacent the outer periphery of disk 139 are two pairs of recesses 142, 143 which respectively receive the projections 132' and 138. At the end of each recess 142 is a plate 144 secured to the surface of the disk 139 and containing a ball bearing 145. A nut 146, shown in Fig. 1, abuts the outer surface of gear 124 to hold the same on the main shaft 84. The nut 146 is secured in place by a key structure 147. As shown in Fig. 1, a washer 149 is secured on the other side of disk 139 and serves as an oil packing gland.

The introduction of fuel into the engine will now be explained. Referring to Fig. 1 and at the left hand side thereof, a conduit 150 extends from a carburetor, not shown, of any conventional type. Conduit 150 is joined to a rotating conduit 151 by sealing connection 152. Within the interior of conduit 151 are a plurality of baffles 153, 154 which are positioned at right angles with respect to each other. The baffle 153 is shown having a multiplicity of openings 155 which tend to agitate the gaseous fuel on its way to the engine so as to bring about a thorough mixing of fuel and air. Conduit 151 extends to a cross 156 which is keyed into the drive shaft at 157.

Referring now to Figs. 4 and 6, the cross 156 is connected to a multiplicity of conduits 158, 159, 160 and 161. These conduits extend into the inlet portions 162 which communicate with the inlet valves 43 within the several pistons. Referring now to Fig. 4 as well as Figs. 6 and 7, the exhaust chamber 163, associated with each of the pistons, communicates with a plurality of chambers 164, 165, 166, 167. As shown in Figs. 4 and 6, a plate 168' is secured over each of the chambers 164—167 so as to seal the same from the outer side. Within each of the chambers is a baffle structure 169 having an inclined surface 170 on its forward end which is directly under the exhaust port from each of the pistons. A small opening 170' is provided in the plate 168' to introduce outside air in the exhaust chamber while the exhaust valve is open. Referring now to Figs. 1, 4 and 6, the several exhaust chambers 164—167 communicate with a passage 168 which is within the interior of the A casting and is exterior to the fuel inlet conduit 151. At the left hand side of Fig. 1, the passage 168 terminates and is connected to a stationary angularly shaped conduit 172 by a locking means 173. It being understood that the gas inlet conduit 151 as well as the tubular portion of the B casting surrounding the passage 168 rotate with the engine and are each separately connected to stationary members.

Referring now to Figs. 4 and 6 in conjunction with Fig. 6, an air ram 174 is secured to the outer side of the A casting and communicates with the exhaust gas port 163 of the piston for introducing fresh air into the exhaust port whence the same intermingles with the spent products of combustion and leaves by any one of the several chambers 164—167 to the outlet for the spent products of combustion. Also shown in Figs. 5 and 8 is an air ram 175 which is in communication with the interior of the several abutments 36. Air is introduced through the forward surface of the ram and vents through an opening 176 in the side thereof.

As shown in Fig. 5, a plurality of rectangular openings 177 within the annular chamber are closed by screens 178. These openings 177 are spaced slightly forward of the rear surface of each of the several abutments 36 and together with the small openings 179, Fig. 7, in the rear of the abutments 36 are intended to provide for escape of air within the quadrant sections of the annular chamber.

The lubrication will now be explained. Referring to Figs. 1, 2, 5, 6 and 9, and initially to Fig. 1, a chamber 180 is formed between the A and B castings and contains a body of lubricating oil, not shown. As the engine rotates at high speed, the oil under the influence of gravity is thrown to the outer periphery of the chamber 180. A pair of arcs 181 are formed integral with the inner surface of the B casting, each of the arcs 181 carrying on one end a piston 182 which is seen in plan view in Fig. 2. As shown in Figs. 1 and 2, an arcuate member 183, which is a part of the A casting, and a ring 184 having a projecting portion 185 are secured by bolts 185' on the inner surface of the A casting and collectively form cylinders within which the pistons 182 arcuately reciprocate. Each of the so-called cylinders is closed at one end by a cylinder head 186, Fig. 2. Referring now to Fig. 2 there is shown a pair of valves 187 which are in fluid communication with the cylinder formed between members 183, 184. As the pistons 182 move in a counter-clockwise direction, as seen in Fig. 2, oil is drawn in from the chamber 180 through the valve 187 into the cylinder by the suction created when the pistons move in that direction above the point at which the valve connects with the cylinder. When the pistons move in an opposite direction, as will be explained in detail hereinafter, the oil contained within the cylinders cannot escape and will force the valves 187 to a closed position. Thereafter the oil enters a passage 188, clearly seen in Figs 1 and 2, in the arcs 181. A pair of check valves 189 are positioned in passage 188 and open under the pressure being exerted by the fluid permitting the same to pass into a passage 190 in the B casting and thence through a horizontal passage 191 to a cross connection 192 whence the oil is free to flow around the bearings 87 and 86 and pass through the teeth of gear 88 and enter the interior of the member 105. Member 105 has a plurality of passages 194 which permits the oil to return into the chamber 180. The angularly shaped plate 102, seen in Figs. 1 and 6, has a plurality of minute passages 195 which permits the oil to pass outwardly into an outer chamber 196. It should be borne in mind that the arcuate shaped rings 181 that support the pistons 182 extend over an area which is less than one-half of the inner surface of the B casting so that oil can flow outwardly between them into the chambers 196. As seen in Figs. 6 and 9, a passage 198 extends from chamber 196 within the interior of both the A and B castings to permit the oil to flow from chamber 196 to the sealing rings 33 on the pistons 31 and abutments 36 so as to lubricate the movement of these members within the combustion chambers. As seen in Fig. 6, a small control valve 200 is provided in the passage 197 to control the flow of oil to the sealing rings 33. As seen partially in Fig. 6 and in side elevation in Fig. 9, a plurality of baffles 201 are secured on the outer surface of the chamber 196 and carried by the A casting to deflect the oil entering chamber 196 and cause the same to return through a passage 202 between the member 102 and the extension 185 of member 184 back into the general chamber 180 so that the major portion of the oil is caused to flow into the area between the extension 185 and the A casting, as clearly shown in Fig. 1. In Fig. 4, a plurality of cocks 203, 204 are provided for introducing the oil into chamber 180 and for measuring the quantity of oil by its liquid level.

As seen on the extreme right of Fig. 1 and designated by the reference character E is a generator 205 having a main shaft 206 which carries a gear 207 splined on the main shaft at 208. Gear 207 meshes with a gear 209 that is splined on the main engine shaft 84 at 210. The several gears are enclosed within a casing 211. The generator 205 is driven when the engine is in operation to supply electric power to the battery 60, shown in Fig. 1, to maintain power for ignition purposes and also for the operation of the electric motor 109.

It will be understood that the main engine shaft 84 will be suitably supported in bearings 212 and 213 and that the main shaft 84 beyond the extremity shown on the right hand side of Fig. 1 will be connected to a clutch, not shown, through which it is properly joined to the main load for which it is provided to drive.

The operation of the device will now be explained. With the parts in the position shown in Fig. 1, the starting of the engine will be explained. Upon closing a circuit, not shown, to motor 109 from the battery 60, the motor 109 will commence to operate and through shaft 110 and gear 112, which is connected to gear 115, will commence to rotate the B casting of the engine. When the B casting has moved a fraction of one rotation, the several abutments 36 will be brought into contact with the faces of the several pistons 31, and the B casting will, therefore, commence to rotate the A casting. This operation continues until motor 109 has reached its full operating speed. When that occurs, the lever 123 is rotated on its axis to the left, as shown in Fig. 1, to engage the clutch 121 with gear 111. The clutch 121 is brought into engagement with the face of gear 111, which gear is normally meshing with gear 124. Gear 111 is of larger diameter than gear 112 and will, therefore, drive the gear 124 at a faster rate than gear 115. Gear 124 is splined to the main drive shaft 84, which is permanently connected to the A casting and will, therefore, cause the T casting to move slightly faster than the B casting to cause the several pistons 31 to move in advance of their respective abutments, and each of the pistons will thereby eventually engage the rear of the abutments ahead of them. In moving away from the faces of the abutments the several pistons operate their respective valve structures and with the opening of the several intake valves 43 by riding up on the dwells 49, gas is introduced from the intake chambers 162 into the combustion chambers 42 within the interior of the pistons, and which is in communication with the annular chamber formed between the curved sides 30, 35 of the two castings. The manually operable lever 123 is then returned to its neutral position, as shown in the drawing, to disengage the clutch 121 from the gear 111, and under the inertia of the A casting, the same will be retarded so as to permit the B casting, which is being driven through the connections, mentioned heretofore, at a substantially constant speed. As the abutments and pistons approach each other the gas is compressed between the coacting faces of the pistons and abutments, after which ignition occurs.

As shown in Fig. 1, the current from battery 60 travels through cable 63 to a conductor 65 and thence to a conducting ring 66, from whence it passes through conductor 68 to the device 69 which permits transfer of the current from the A side, as shown in Fig. 15. When the two conducting faces 72, 76 are brought into sliding engagement with each other, whence the current travels through member 74 to the ignition coil 80, shown in Fig. 5, and thence through the conductor 81 to the spark plug 82, it being understood that ignition occurs between each coacting set of pistons and abutments at one time. Following the explosions, several things occur substantially simultaneously, and each of the actions will now be explained individually. First of all, the A casting will move in advance of the B casting but in the same direction and to exert force upon the load. The spent products of combustion and the introduction of new fuel charges are controlled by the several valves 43, 44. The exhaust valves 44 are operated by the dwells 49, seen in Fig. 9, to permit the spent gases to pass from the combustion chamber 42 into the exhaust portion 163. Momentarily thereafter the intake valves 43 are actuated by the dwells 47 to introduce fresh fuel charges into the combustion chambers. The closing operation of the valves is controlled by the arcuate shaped levers 56, 58, seen in Fig. 9, which are in turn pivotally mounted at 57, 59. These levers 56, 58, under the influence of centrifugal force, will bias the valves to a normally closed position, and replace the usual springs provided for closing conventional valves.

Referring now to Fig. 3 in conjunction with Fig. 1, will be shown the interconnection between the A and B portions which provide for the impact of the explosions to be directed in only one direction. It will be understood that the structure shown in Fig. 3 operates in a counter-clockwise direction. When the explosions occur, as previously mentioned, the A casting moves ahead of the B casting and if uncontrolled, the B casting would tend to move in an exactly opposite direction, except that a planetary gear system is provided between the two portions to direct the force in such a way as to make them move in the same direction and to transmit that negative force directed against the B casting in a positive manner against the main driven shaft so that the shaft will operate in only one direction. The multiplicity of bolts 100 are carried by the B casting and at the time of the explosion these bolts will engage the multiplicity of ratchets 98, as shown in Fig. 3. The ratchets 98 are carried by pins 99 onto a ring gear 97 which is connected to the several small gears 93, 94, 95 and 96. These small gears are connected by rivets 93' with a lower set of gears 89, 90, 91 and 92 which mesh with a central gear 88 that is splined on the main driven shaft 84. When the explosions occur, the tendency to move in a reverse direction on the part of the B casting is transmitted by the ring gear to the upper small gears. This causes the several detents 103 to disengage from the openings 104 in the ring gear and cause the impact to be directed through the central gear 88, which it should be understood is rotating in a counter-clockwise direction as seen in Fig. 3, to apply the force exerted against the B casting directly to the main driven shaft in the way that the engine is running. Shortly thereafter the multiplicity of detents 103 will again re-engage the openings 104 and cause the entire gear train to run at the same speed as the drive shaft and in the same direction in a relatively neutral condition.

The action described heretofore would indicate that the several pistons are now advancing at a slightly increased rate of speed and in the direction of the rear of their succeeding abutments. Provided the load is not excessive, the pistons will engage the rear surfaces of the succeeding abutments and will be locked in that position by means shown in Figs. 1, 11 and 12. The several plugs 129 carried in the gear 126, have their outer appendages 132' riding in the slots 134 of gear 115 and when the pistons are engaging the rear of their succeeding abutments, these projections 132' as well as the outer ends of the plugs 129 will be penetrating the slots 135 and extending into the slots 142 of the member 139. The member 139 is rotated at a constant speed with gear 115 by means of the projections 138, shown in dotted lines in Fig. 11, which extend into the slots 143, as shown in Figs. 1 and 12. As the load begins to retard the movement of the A casting, or stated conversely, the B casting begins to catch up with the A casting, the locking mechanism disengages and the inclined surfaces 136, 137 on the gear 115 engage the bevelled surface 133 on the plugs 129 to cause the same to be elevated out of the opening 135 to permit the projections 132' to again ride in the slots 134. The ball bearings 145 in the members 144 tend to aid in lifting the projections 132' out of the slots 142. The purpose in locking the A and B castings together in this manner is to properly control the speed of the engine and prevent it from operating at excessive speeds. As long as the load is not too heavy, the A and B castings will interlock in the manner just described after each explosion, and will continue to rotate without the impetus of further explosions until the inertia of the load disengages the portions, whence another series of explosions occur. If by chance the load is so heavy that the pistons do not move into engagement with the rear of the succeeding abutments to enter into the locking engagement, another series of explosions will occur shortly thereafter. Thus it is possible, under a light load, for the engine to rotate several times without explosions occurring, whereas if the load is relatively heavy, it is possible for as many as three sets of explosions to occur in all of the explosion chambers in one rotation of the engine.

When the engine is operating at a greater speed than motor 109, gear 112 is operating at a greater speed than clutch 117 and will slip with respect to the clutch until the speed of the engine is retarded to the speed of motor 109, whence the two portions will become unlocked.

The fresh fuel is introduced through the conduit 150 into the rotating conduit 151 and by means of the baffles 153, 154 it is thoroughly intermixed before passing into the combustion chambers, by traveling counter-current to the spent gases it is also thoroughly heated. The spent gases after leaving the combustion chamber 42, as shown in Figs. 4 and 6, are directed against the inclined surfaces 170 of the baffle structure 169 and tend to give additional force to the A casting as they pass out through the outlet conduits. A small opening 170' is provided in the baffle 169 to introduce a small amount of fresh air into the combustion chamber immediately after the explosion to aid in dispersing the burnt gases. As shown in Fig. 1, the burnt gases are exhausted through the conduit 172 in the usual manner after having traveled counter-current to the incoming gas.

In order to cool the engine, as shown in Figs. 4 and 5, air rams 174, 175 are carried by the respective pistons and abutments to scoop in outside air and in the case of the pistons, to flush this air around the exhaust port 163 and thence outwardly with the spent gases. In the case of the abutments, the air ram 175 introduces air into the interior of the abutments and permits the same to escape through the openings 176. As shown in Fig. 5, several openings 177 are provided in the B casting immediately forward of the rear surface of each of the abutments to provide for escape of air from within the annular chamber as the pistons advance under the force of the explosions. Just beyond these openings is formed a small pocket which communicates with a small opening 179, Fig. 7, in the rear of each of the abutments to allow a reduced escaping of air into the rear of the several abutments whence the same may escape through the openings 176. This is to cushion the contacting of pistons and the rear of the advanced abutments.

When the A casting unlocks or slows up, the B casting is running at a substantially constant speed because of the fact that gears 112, 115 are always connected and clutch 117 is engaging gear 112. As the respective pistons and abutments approach each other the dwells 47 and 49 on the cam ring 46 are pivoted because the valve stems engage the bevelled surfaces 51, 52 and force the dwells outwardly. The springs 54 act to replace the dwells in their proper positions.

The lubrication of the engine is a combination of centrifugal force together with a pumping action. As shown in Figs. 1, 2, 6 and 9, a body of oil is contained within a chamber 180 and is pumped by a pair of pistons 182 operating in arcuate shaped tracks between members 184, 185. As shown in Fig. 2, these arcuate shaped tracks are visible and adjacent a closed end of each of the tracks is a suction valve 187 which is actuated as the piston moves ahead of the valve in a counter-clockwise direction. When the oil is drawn into this track by suction and the A and B castings move relative to each other, as has been explained heretofore, the oil is forced into channels 188 past check valves 189 and thence into channels 190, 191 and 192 to oil the bearings and to flood the oil in and about the gears through the openings 193. Some of the oil makes it way into an outer chamber 196 whence it enters small passages to lubricate the coacting surfaces between the peripheries of the two main castings, but to prevent all of the oil from remaining in this position, the several baffles 201 are provided.

As it is necessary to provide electrical current, the electric generator 205, which is of conventional construction, is geared onto the right hand end of the main shaft 84 to provide current for the battery 60 and for the operation of motor 109.

The fluid stabilizer indicated by general reference character C is an inertia element and is intended to stabilize the rotation of the B casting.

The advantages of the invention are much too numerous to be set forth here in detail; however, the principal advantage is in a greatly increased amount of power per unit of fuel used than has heretofore been possible in the more or less conventional type engines. This will be self-evident from the construction of the engine because in the conventional piston-crankshaft arrangement in addition to the power normally consumed by the crankshaft, an additional amount must be consumed in the compression of each of the pistons when said piston is moving in its compression stroke and in an opposite direction to another piston that is moving under the impetus of an explosion. Moreover, in the present invention the pistons move in an arcuate direction at a distance spaced outwardly from the driven shaft which gives a multiplied effect on the shaft.

I claim:

1. A rotary engine, comprising two relatively movable disks which are generally circular in outline and have a common central axis, a shaft extending through the common axis of said disks and rigidly connected to one of the disks, a first member carried on the inner surface of one of said disks, a second member carried on the inner surface of the other of said disks and cooperating with the first named member to form opposite ends of an explosion chamber between said disks, and sealing means extending between adjacent portions of said disks for slidably sealing the periphery of one of said disks to the other disk in such a manner as to enclose the sides of the explosion chamber and permit relative movement between said members.

2. A rotary engine, comprising a pair of movable members each formed with an annular groove on a lateral surface, sealing means joining said members adjacent their peripheries in such a manner that the grooved portions form an annular chamber, a plurality of pistons positioned in said annular chamber and joined to one of said members, and a plurality of abutments positioned in said annular chamber in opposition to the pistons and joined to the other of said members, the piston-carrying member being relatively movable with respect to the abutment-carrying member to form expanding chambers between the abutments and the pistons.

3. A rotary engine, comprising two relatively rotatable members forming together an annular chamber, a first plurality of elements united to one of said members within said chamber, a second plurality of elements united to the other of said members within said chamber and cooperating with said first plurality of elements to form a plurality of expansible chambers when said members are moved relative to each other, valve means carried by one of said members and actuated by the relative movement of the other member for introducing fuel into said chambers and exhausting the spent products of combustion, and ignition means carried by one of said members and actuated by the relative movement of said members for igniting the fuel within said chambers.

4. In a rotary engine, in combination, a pair of relatively rotatable members forming together an annular chamber, a first plurality of elements united to one of said members within said chamber, a second plurality of elements united to the other of said members within said chamber and cooperating with said first plurality of elements to form a plurality of expansible combustion chambers, means for introducing and igniting an explosive charge within each of said several combustion chambers, and mechanical means operatively connecting said members and being effective to differentially advance one of said members as a result of combustion when said charges are ignited.

5. A rotary engine, comprising a pair of relatively movable members forming together an annular chamber, a piston within said chamber and secured to one of said members, an abutment within said chamber and secured to the other of said members, means carried by said members and operated by their relative movement for introducing and igniting an explosive mixture in said chamber between the piston and the abutment, a shaft extending transversely through the centers of said members and secured to the piston-carrying member, a planetary gear system positioned within the space between said members and connected to said shaft, and ratchet means carried by the gear system and engageable with portions of the abutment-carrying member to transmit the force of the explosion through the gear system to the shaft whereby the abutment-carrying member is caused to move in the same direction as the piston-carrying member after an explosion occurs.

6. A rotary engine, comprising a pair of relatively movable disks each formed with an annular groove on a lateral surface adjacent the outer periphery of the disks, said disks being interconnected adjacent their outer peripheries in such a manner that the grooved portions form a continuous sealed annular chamber between the disks, a plurality of pistons positioned in said annular chamber and joined to one of said disks, a plurality of abutments positioned in said annular chamber and joined to the other of said disks, the piston carrying disk being relatively movable with respect to the abutment carrying disk to form expanding chambers between the abutments and the pistons, valve means carried by said pistons for exhausting and admitting gases with respect to the chambers between said pistons and abutments when the pistons are moving relative to the abutments in forming the expanding chambers, cam means carried by the abutment carrying member for operating said valve means, and a driving member connected to one of said disks for moving said disks relative to the other disk to contract the chambers between the pistons and their cooperating abutments.

7. A rotary engine, comprising a pair of members forming together an annular chamber, a piston within said chamber and secured to one of said members, an abutment within said chamber and secured to the other of said members, said members being relatively movable to form an expansible chamber between the piston and the abutment, valve means carried by the piston for delivering an explosive mixture to said chamber, a driving member connected to the abutment for differentially advancing said member relative to the piston carrying member to compress the explosive mixture, and ignition means carried by one of said members and actuated by a portion of the other member to ignite the mixture when said members are in a predetermined position relative to each other.

8. A rotary engine, comprising two relatively movable disks which are generally circular in outline and have a common central axis, an annular groove formed on the inner surface of each of said members, means for interconnecting said disks in such a manner that the grooved portions form an annular chamber between the disks, a first member positioned in said chamber and connected to one of said disks, a second member positioned in said chamber and connected to the other of said disks and cooperating with said first member to form an expandable explosion chamber, a shaft extending transversely through the common axis of said disks and rigidly connected to one of said disks, and a gear system operatively connecting each of said disks and said shaft in such a manner as to translate relative movement between said disks to the rotation of the shaft in only one direction.

9. In a rotary engine including first and second differentially movable members which are adapted to rotate in the same direction, a shaft extending transversely through the central axis of said members and rigidly connected to the first of said members, means for initially rotating said members including a motor, a continuous driven connection extending between said motor and the second of said members, an intermittent driven connection between said motor and said shaft which is effective to drive said first member at a rate faster than the second member to differentially advance the first member relative to the second member, and manually operable means connected to said intermittent connection to operate the same.

10. In a rotary engine, in combination, a pair of relatively rotatable members forming together an annular chamber, a first plurality of elements united to one of said members within said chamber, a second plurality of elements united to the other of said members within said chamber and cooperating with said first plurality of elements to form a plurality of expansible combustion chambers, means carried by one of said members and actuated by the other member for introducing and igniting an explosive charge within each of said several chambers, a first means operatively connecting said members and being effective to differentially advance one of said members after combustion has occurred, whereby each of said first plurality of elements are brought into contact with the rear of each of said second plurality of elements, and a second means operatively connecting said members and adapted to temporarily lock said members together when said one member is in its advanced position.

RALPH H. LESHER.

No references cited.